United States Patent [19]

Smith

[11] Patent Number: 5,721,853
[45] Date of Patent: Feb. 24, 1998

[54] SPOT GRAPHIC DISPLAY ELEMENT WITH OPEN LOCKING AND PERIODIC ANIMATION

[75] Inventor: Kim C. Smith, Colleyville, Tex.

[73] Assignee: Ast Research, Inc., Irvine, Calif.

[21] Appl. No.: 431,280

[22] Filed: Apr. 28, 1995

[51] Int. Cl.$^6$ ............................................. G06F 3/00
[52] U.S. Cl. ..................... 395/353; 395/347; 395/344; 395/349
[58] Field of Search .................... 395/326–358; 345/146, 702

[56] References Cited

U.S. PATENT DOCUMENTS

| | | | |
|---|---|---|---|
| 4,712,191 | 12/1987 | Penna | 395/353 |
| 4,772,882 | 9/1988 | Mical | 395/353 |
| 4,931,783 | 6/1990 | Atkinson | 395/353 |
| 5,119,475 | 6/1992 | Smith et al. | 395/353 |
| 5,121,477 | 6/1992 | Koopmans et al. | 395/353 X |
| 5,276,795 | 1/1994 | Hoeber et al. | 395/353 |
| 5,287,514 | 2/1994 | Gram | 395/333 |
| 5,345,550 | 9/1994 | Bloomfield | 395/353 |
| 5,485,175 | 1/1996 | Suzuki | 395/353 |
| 5,500,935 | 3/1996 | Moran et al. | 395/352 |
| 5,524,195 | 6/1996 | Clanton, III et al. | 395/355 X |
| 5,537,630 | 7/1996 | Berry et al. | 395/335 X |
| 5,564,112 | 10/1996 | Hayes et al. | 395/352 |
| 5,581,670 | 12/1996 | Bier et al. | 395/352 |
| 5,596,699 | 1/1997 | Driskell | 345/146 |
| 5,600,778 | 2/1997 | Swanson et al. | 395/335 X |

OTHER PUBLICATIONS

Hopkins et al., "Pies: Implementation, Evaluation, and Application of Circular Menus", University of Maryland, pp. 1–27, 1988.

Kurtenbach, "The Design and Evaluation of Marking Menus", University of Toronto, pp. 1–103, 1993

Don Hopkins, *The Design And Implementation of Pie Menus*, Dec. 1991, pp. 16–18, 20–26 and 94.

*Primary Examiner*—John E. Breene
*Attorney, Agent, or Firm*—Knobbe, Martens, Olson, & Bear, LLP

[57] ABSTRACT

A system for implementing an unobtrusive, always-on-top interface-to-interfaces comprises a spot interface that is sufficiently small that it may lie unobtrusively over any open window such that it is always on top thereby enabling a user conveniently to access any available window without first having to return to a main window or close other open windows. The spot interface comprises an active region represented by a small graphical display element (GDE) having the appearance of a sphere, which unless disabled by a user, is always visible regardless of which is the topmost window. When a mouse pointer is moved into the spot GDE, a ring or collar having four radial quadrants representing menu items is displayed after waiting a user specified length of time. These radial menu items are displayed around the GDE. When the mouse pointer is subsequently moved into any of the four quadrants of the collar, a secondary rectangular interface hierarchically associated with the quadrant is displayed after waiting a user specified length of time. The secondary interface may be locked opened such that it will not close when the mouse pointer is moved out of area defined by the interface. Periodic animation of the spot GDE may be provided.

36 Claims, 7 Drawing Sheets

SPOT GRAPHIC DISPLAY ELEMENT WITH OPEN LOCKING AND PERIODIC ANIMATION

TECHNICAL FIELD

The invention relates generally to user interfaces for computers and, more particularly, to an always-on-top interface to interfaces for personal computers and the like.

BACKGROUND OF THE INVENTION

Graphical user interfaces, or "GUIs" as they are often designated, have become an increasingly common and popular feature of computers, especially personal computers (PCs). One of the many advantages of such GUIs is that they allow a user to enter commands by selecting and manipulating graphical display elements, such as icons, usually with a pointing device, such as a mouse. A mouse is an input device which, when moved over a surface, moves a mouse pointer across the computer display in a corresponding manner. Typically, a mouse has at least two buttons which when pressed, generate to the computer an input relating the user and the location of the mouse pointer on the computer display. "Clicking" will be used herein to refer to the pressing and releasing of a mouse button, usually the left mouse button, unless otherwise specified. The icons of a GUI are designed to behave in a manner similar to the objects they represent. The Apple Macintosh user interface and Microsoft Windows operating environment are two common and very popular examples of GUIs, illustrating the fact that the advantages of GUIs over conventional text-based user interfaces are widely recognized.

Clearly, GUIs significantly reduce the amount of information that a user must recall in order effectively to use the computer. For example, instead of having to remember the name of an application program and the location of the program on a particular disk and within a particular folder or directory, the user need only remember the icon associated with the application. As a result of the ever-increasing popularity of GUIs, a variety of different means for organizing and navigating through the various application and other programs have been developed. One popular navigational metaphor, commercially available from Xerox Corporation as TabWorks™, uses a book type metaphor, wherein each page thereof comprises a different window-type menu and the user can navigate among the pages by using a mouse to click on a tab associated with the desired page of the book. Such GUI metaphors suffer certain deficiencies, the primary one being that real world metaphors, such as books, are not as flexible as electronic metaphors tend to be and typically require a great deal of mouse movement to maneuver among windows.

Another type of navigational metaphor are known as a "pie menus," which are two-dimensional, circular user interfaces used in lieu of linear menus in GUIs. In their two-dimensional form, pie menus are round menus wherein menu items are positioned around a small, inactive region in the center of the circle like slices of a pie, rather than in rows or columns as in conventional linear menus. In operation, the mouse pointer begins in the center of the pie in a small inactive region. The active regions representing the menu items therefore are all adjacent to the cursor, but each in a different direction, and menu items are selected by clicking the mouse and then pointing in the direction of the menu item. Visual feedback may be provided to the user in the form of highlighting the selected "slice."

Pie menus of the type described above suffer certain deficiencies, not the least of which is that they must somehow be invoked before they are displayed and, once invoked or opened, they occupy most of the display, overlying any open window(s), until closed. In other words, pie menus are not minimizable, they are either displayed, in which case they cover most of the display, or concealed, in which case some action must be take to invoke them. Additionally, pie menus often include a confusing number and array of menu items from which a user is required to select.

A third type of navigational metaphor, implemented in the Windows 95 software soon to be commercially available from Microsoft Corporation, of Redmond, Wash., comprises a single "start button" located on a border of the desktop, or main screen, of the GUI. The start button, being on the border of the desktop on which all subsequent windows are opened, is always visible and embodies all of the software functionality of the GUI. To make a selection, the user first clicks on the start button, at which point a conventional linear menu associated with the button is displayed. Selection of one menu item from this initial menu results in the display of another menu associated with the selection. This continues until the user makes a final selection associated with an application or other program. Therefore, unless a user is intimately familiar with all of the successive menus, as well as the available menu picks thereof, navigation using the start button and its succession of linear menus can be extremely complicated, in that a user must know exactly which pick to make from each menu in order to access the desired functionality. In addition, due to a peculiarity inherent in the design of Windows 95, once the desktop and icons displayed thereon are covered up by other open windows, as will almost always occur at some point during normal use of a computer, especially where the user is operating in a full-screen windowing mode, it is not possible to "task switch," e.g. by simultaneously pressing the ALT and TAB keys, back to the desktop display on which the icons are displayed. As a result, once the user has covered the desktop with other windows, if he or she wants to use the desktop icons, rather than the start button, to open additional applications or windows, he or she must close or minimize all of the open windows displayed over the desktop and then subsequently reopen or maximize them for use. This process is an obvious inconvenience to the user.

Clearly, none of the above navigational metaphors are well suited for maneuvering in a multi-tasking, GUI environment. Accordingly, what is needed is a user interface/navigational metaphor that is always available to the user, includes all of the choices necessary, but that is small enough so as not to get in the way.

SUMMARY OF THE INVENTION

The foregoing problems are solved and a technical advance is achieved by a system for implementing an always-on-top interface-to-interfaces hereinafter referred to as a spot interface. In a departure from the art, the spot interface is sufficiently small that it may lie unobtrusively over any open window such that it is always "on top" thereby enabling a user conveniently to access any available window without first having to return to a "main" window or close other open windows.

In a preferred embodiment, the spot interface comprises an active region represented on a computer display as a small graphical display element having the appearance of a sphere (hereinafter, the "spot GDE"), which, unless disabled by a user, is always visible regardless of which window comprises the topmost window. When the mouse pointer is moved into the region defined by the spot GDE, a ring, or "collar," having four quadrants is displayed around the GDE. When the mouse pointer is subsequently moved into any one of the four quadrants of the collar, a secondary interface associated with that quadrant is displayed. The user may interact with the displayed secondary interface until such time as the interface closes its own window or until the pointer is moved out of the quadrant. As used herein, the term "spot user interface" will be deemed to include the spot GDE, as well as its collar and associated secondary interfaces.

In one aspect of the invention, the user can "lock" a secondary interface open such that it will not close even when the mouse pointer is moved out of the area defined by the interface by clicking on a designated area associated with the interface. In the preferred embodiment, this designated area is a substantially square shaped area located in the corner of the interface closest to the spot GDE and is indicated by a padlock icon located in that area. In another aspect of the invention, the spot interface, including the spot GDE and collar or any open secondary interfaces, can be moved to any location on the display by the user's clicking on the spot GDE and then "dragging" it to the desired location. In the preferred embodiment, if the spot interface is dragged too close to the edge of the display, such that a portion of one or more open secondary interfaces extend beyond the edge of the display 16, the interface automatically repositions itself so that all of the open secondary interfaces are displayed in their entireties. In an alternative embodiment, the spot interface does not reposition itself, such that only a portion of any open interfaces may be displayed when the spot interface is positioned too close to the edge of the display.

In yet another aspect of the invention, the user may alter the appearance and/or behavior of the spot GDE using a menu pop-up associated therewith, which may be accessed by clicking the right mouse button while the mouse pointer is over the spot GDE. In yet another aspect of the invention, upon initiation of the spot interface and periodically thereafter, the spot GDE animates to draw attention to itself, thereby to remind the user that it is available for use.

A technical advantage achieved with the invention is that it provides maximum functionality in minimum form.

A further technical advantage achieved with the invention is that it provides functionality "on demand" from any location on the desktop.

A further technical advantage achieved with the invention is that it consolidates functionality at a central "always-on-top" point on the screen.

Yet another technical advantage achieved with the invention is that various aspects of its operation and appearance may be customized to suit a user's needs and preferences.

DESCRIPTION OF THE PREFERRED EMBODIMENTS

Figure 1:
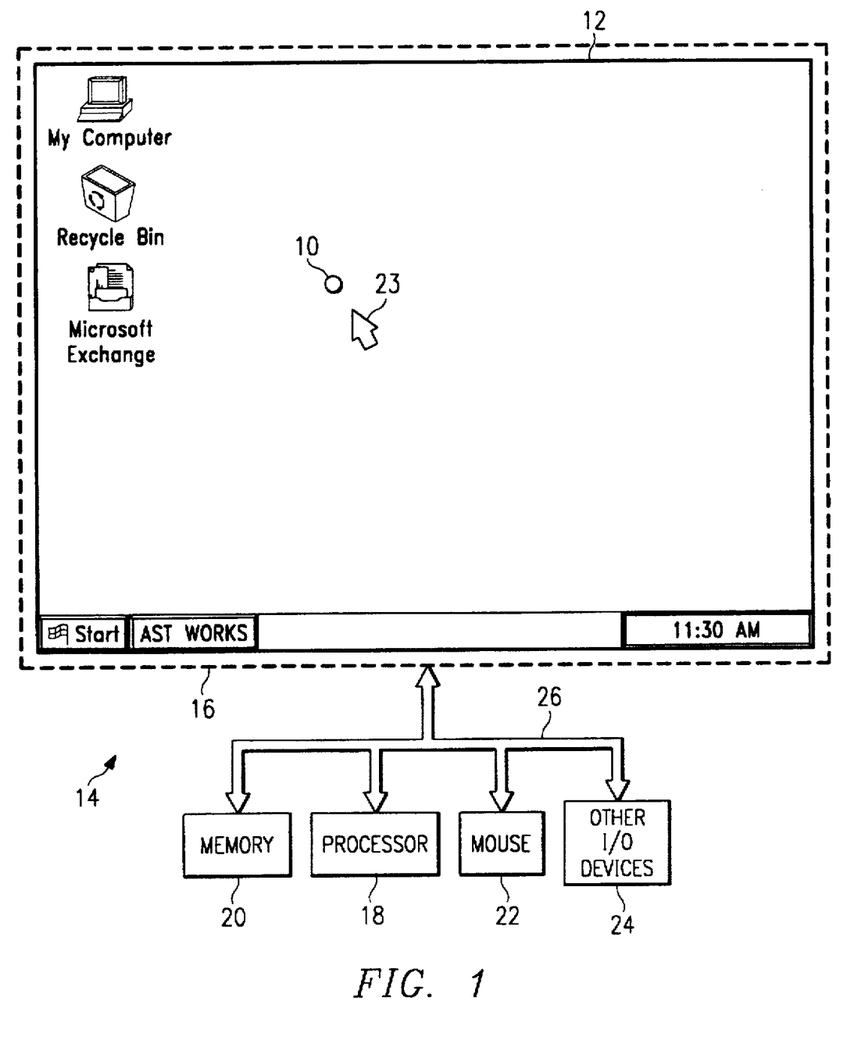
FIG. 1 illustrates a computer system for implementing a user interface embodying features of the present invention.

Referring to FIG. 1, a spot GDE 10 of a spot interface of the present invention is shown as being overlaid on a window 12 of a graphical user interface (GUI). In the illustrated embodiment, the window 12 is the main window of the Windows 95 GUI developed by Microsoft Corporation. It is understood that the spot interface and window 12 are generated by a computer 14 comprising a display 16, a central processing unit (CPU) 18, a memory device 20, a mouse input device 22 for manipulating a mouse pointer 23 and other input/output ("I/O") devices 24, including a keyboard, interconnected in a conventional manner via a bus 26.

As shown in FIG. 1, the spot GDE 10 is spherical in appearance and is sufficiently small as to be able to float on top of the foremost open window, in this case, the window 12, without obstructing much, if any, information thereon. In fact, in the preferred embodiment, the spot GDE 10 fits within a 16-by-16 pixel square, which is the smallest icon size supported by Windows 95. The spot interface, including the spot GDE 10, collar (FIG. 2) and/or any open secondary interfaces (FIGs. 3A–3E), may be moved to a different location on the display 16 by positioning the mouse pointer 23 over the spot GDE 10 and then clicking and dragging it to the desired location. In the preferred embodiment, if the spot interface is dragged too close to the edge of the display 16, such that a portion of one or more open secondary interfaces extend beyond the edge of the display 16, the spot interface automatically repositions itself so that all of the open secondary interfaces are displayed in their entireties. In an alternative embodiment, the spot interface does not reposition itself, such that only a portion of an open secondary interface may be displayed when the spot interface is positioned too close to the edge of the display 16. Additionally, although not shown, in one unique aspect of the invention, upon initiation of the spot interface and periodically thereafter during operation thereof, as specified by the user, the spot GDE 10 animates to draw attention to itself.

Figure 2:
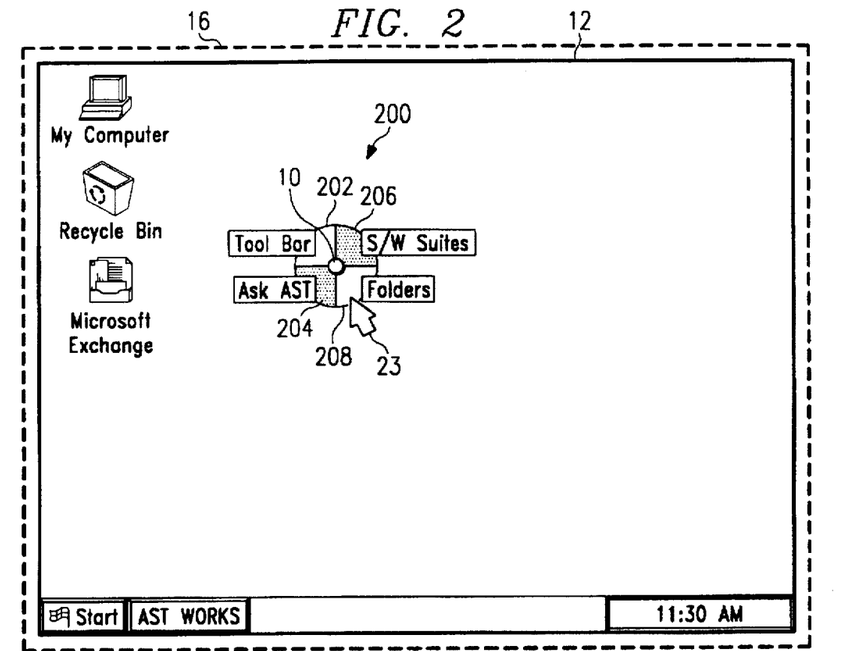
FIG. 2 illustrates a spot GDE and collar of the spot interface of the present invention.

Referring to FIG. 2, when the mouse pointer 23 is moved over the spot GDE 10, a collar 200 of the spot interface is immediately displayed. This displaying of the collar 200 occurs without the user's having to click on any element of the spot interface using the mouse 22; rather, simply moving the pointer into the area defined by the GDE 10 will cause the collar 200 to be displayed. As shown in FIG. 2, the collar 200 comprises four quadrants 202, 204, 206 and 208, respectively labeled "Tool Bar," "Ask AST," "S/W Suites," and "Folders," it being understood that the identity of the quadrants, as well as the functionality accessible therewith, do not form a vital part of the present invention and are included for purposes of explanation and clarification only.

As will be described in detail below with reference to FIGs. 3A–3E, each of the quadrants 202–208 corresponds to a different one of four secondary interfaces. Movement of the mouse pointer 23 into any of the four quadrants 202–208 causes the corresponding secondary interface to be displayed. As with the display of the collar 200, the user need not click on a quadrant 202–208 to cause the display of the corresponding secondary interface; rather, the display is automatic responsive to detection of the mouse pointer 23 within the area defined by quadrant. Similarly, movement of the mouse pointer 23 out of the secondary interface once it has been opened closes the interface, unless the interface has been "locked" open, as will be described.

Figure 3A:
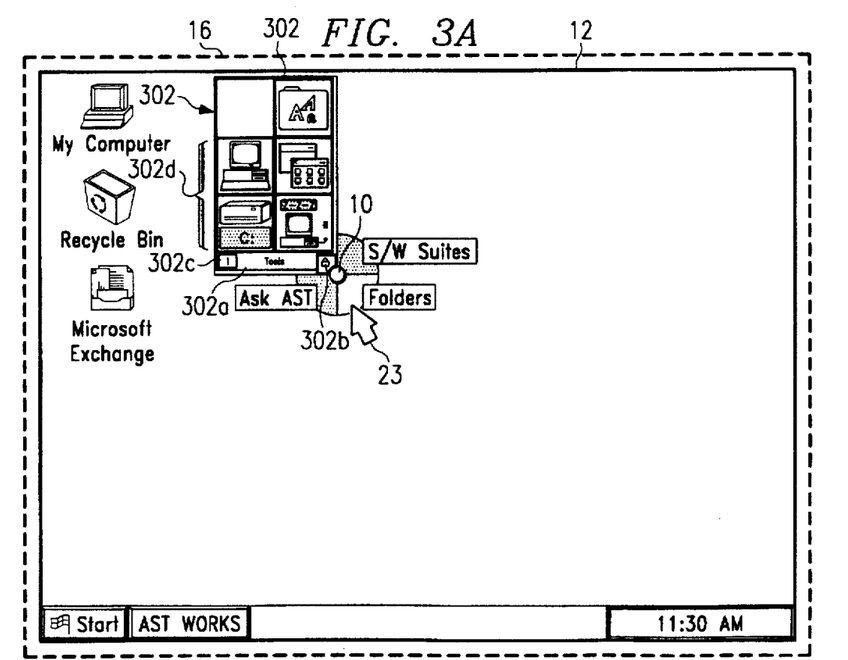
FIGs. 3A–3F illustrate the various secondary interfaces of the spot interface of the present invention in locked and unlocked conditions.

Movement of the mouse pointer 23 into the quadrant 202 labelled "Tool Bar" results in the display of a secondary interface 302, as shown in FIG. 3A. As will become readily apparent, all of the secondary interfaces of the spot interface, including the interface 302, share certain common features. In particular, the interface 302, like all of the interfaces, includes a caption bar 302a having a caption, in this case, "Tools," a lock icon 302b located in the corner of the interface closest to the spot GDE 10 for locking and subsequently unlocking the interface, and a menu icon 302c located at the opposite end of the caption bar 302a as the lock button 302b for displaying a menu of standard Windows commands, and a plurality of buttons 302d. It should be recognized that the buttons 302d operate in a conventional manner in that they enable the user to open additional windows or initiate execution of applications programs simply by clicking on the appropriate button(s).

Figure 3B:
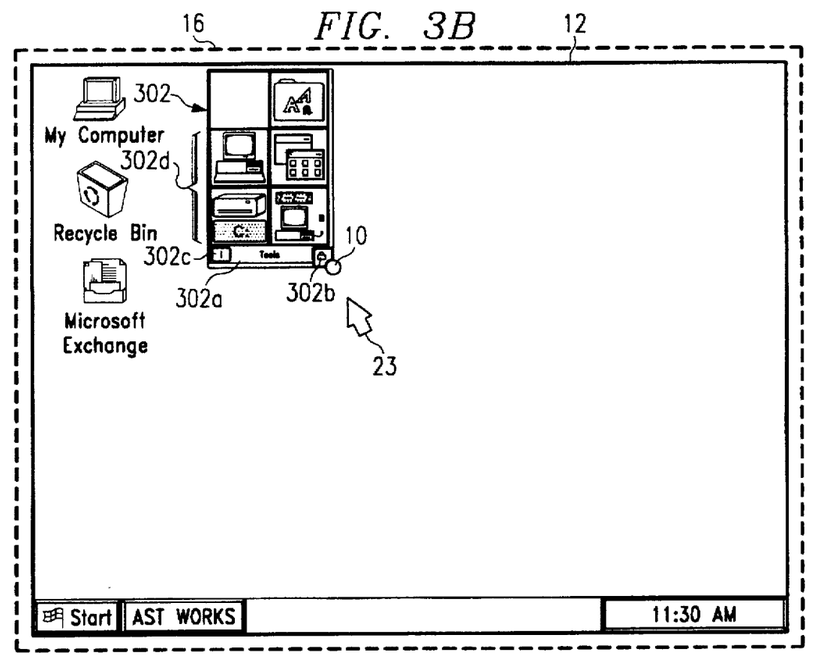

As previously indicated, clicking on the lock icon 302b will lock the interface 302 in an open position. As long as the mouse pointer 23 is positioned over the collar 200 or the interface 302, the collar 200 will be displayed, as shown in FIG. 3A. When the interface 302 is not locked and the mouse pointer is moved outside of the interface 302, the interface will be concealed and the spot interface will return to its state as shown in FIG. 2, if the mouse pointer 23 is positioned over the collar 200 or spot GDE 10, or FIG. 1 if the mouse pointer 23 is moved outside both the collar 200 and the spot GDE 10. In contrast, as illustrated in FIG. 3B, when an interface, such as the interface 302, is locked open by clicking on its lock icon and the mouse pointer 23 is moved outside the interface and the collar 200, the locked interface will remain displayed and the collar 200 will be concealed until the mouse pointer 23 is once again moved over the spot GDE 10. It will be recognized that a locked interface may subsequently be unlocked by clicking on its lock icon.

Figure 3C:
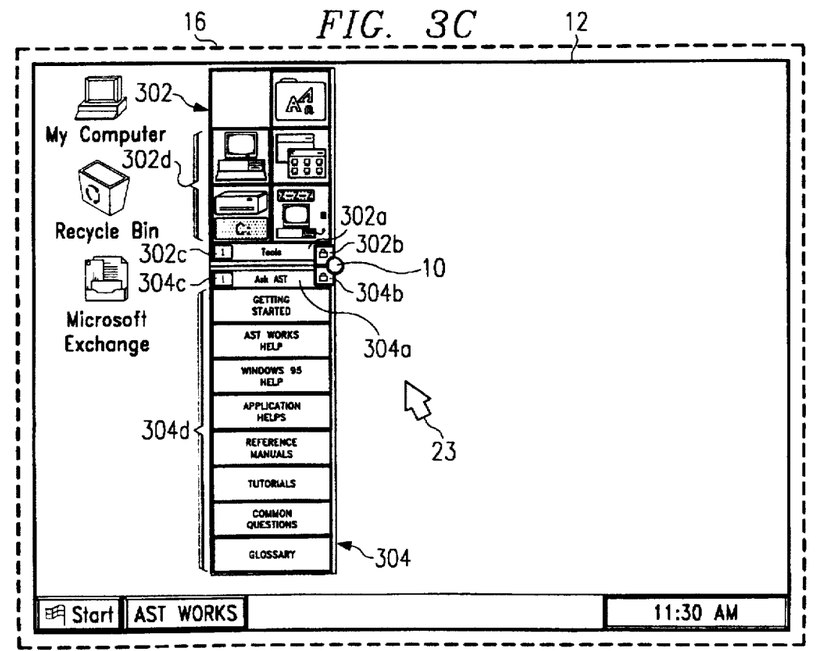
Figure 3D:
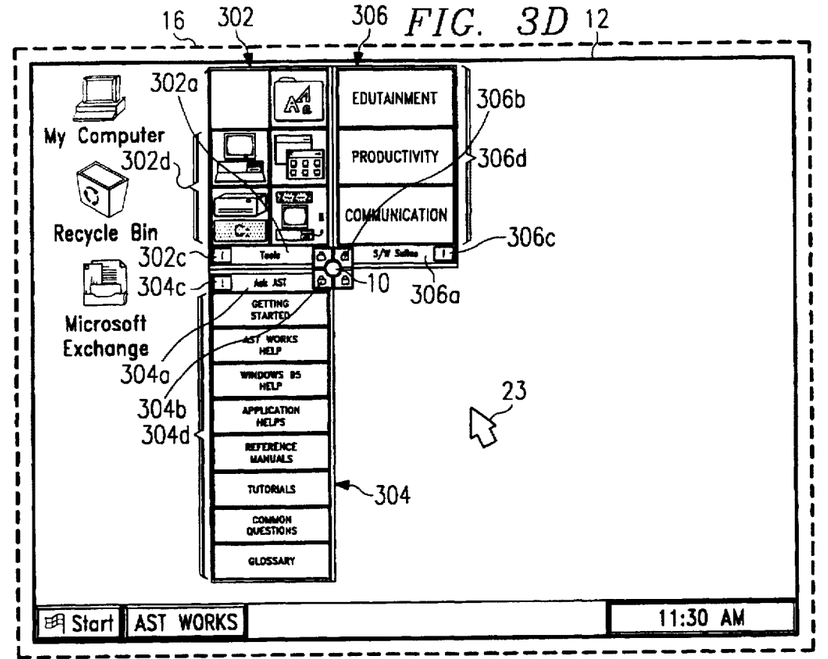
Figure 3E:
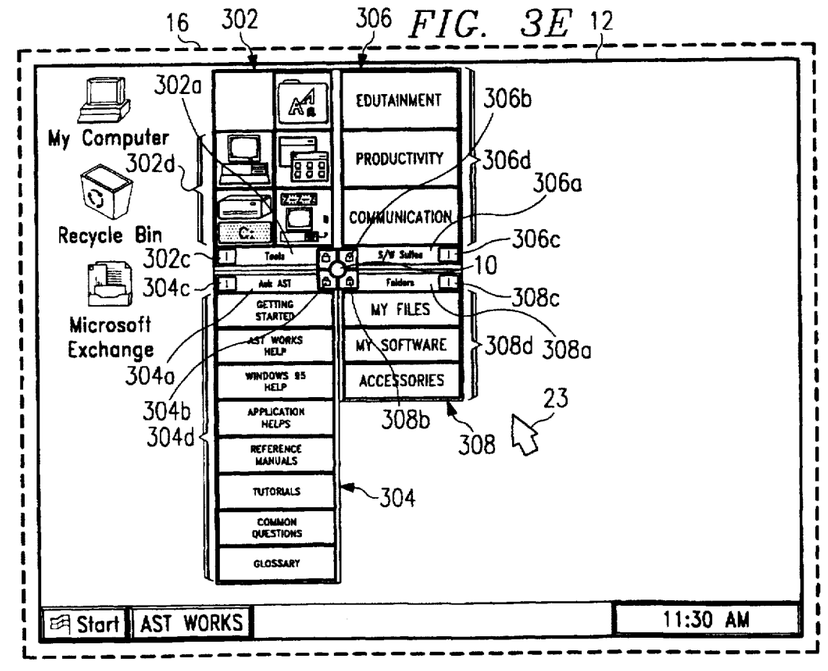

FIGs. 3C, 3D and 3E respectively illustrate the spot interface with two, three and four secondary interfaces locked open. It should be recognized that, although particular embodiments of the spot interface are illustrated in FIGs. 3A–3E, the secondary interfaces 302–308 may be opened and/or locked in any order and combination, thereby varying the appearance of the spot interface. Moving the mouse pointer 23 over the quadrant 204 (FIG. 2) labeled "Ask AST" causes a secondary interface 304, as shown in FIG. 3C, to be displayed. Similar to the interface 302, the interface 304 comprises a caption bar 304a including a caption, in this case "Ask AST," a lock icon 304b, a menu icon 304c and a plurality of buttons 304d. The interface 304 can be locked (as shown in FIG. 3C) and subsequently unlocked by clicking on the lock icon 304b.

Moving the mouse pointer 23 over the quadrant 206 (FIG. 2) labeled "S/W Suites" causes a secondary interface 306, as shown in FIG. 3D, to be displayed. Similar to the interfaces 302 (FIGs. 3A, 3B) and 304 (FIG. 3C), the interface 306 comprises a caption bar 306a including a caption, in this case "S/W Suites," a lock icon 306b, a menu icon 306c and a plurality of buttons 306d. The interface 306 can be locked (as shown in FIG. 3D) and subsequently unlocked by clicking on the lock icon 306b.

Moving the mouse pointer 23 over the quadrant 208 (FIG. 2) labeled "Folders" causes a secondary interface 308, as shown in FIG. 3E, to be displayed. Similar to the interfaces 302 (FIGs. 3A, 3B), 304 (FIG. 3C) and 306 (FIG. 3D), the interface 308 comprises a caption bar 308a including a caption, in this case "Folders," a lock icon 308b, a menu icon 308c and a plurality of buttons 308d. The interface 308 can be locked (as shown in FIG. 3E) and subsequently unlocked by clicking on the lock icon 308b.

Figures 3F, 4:
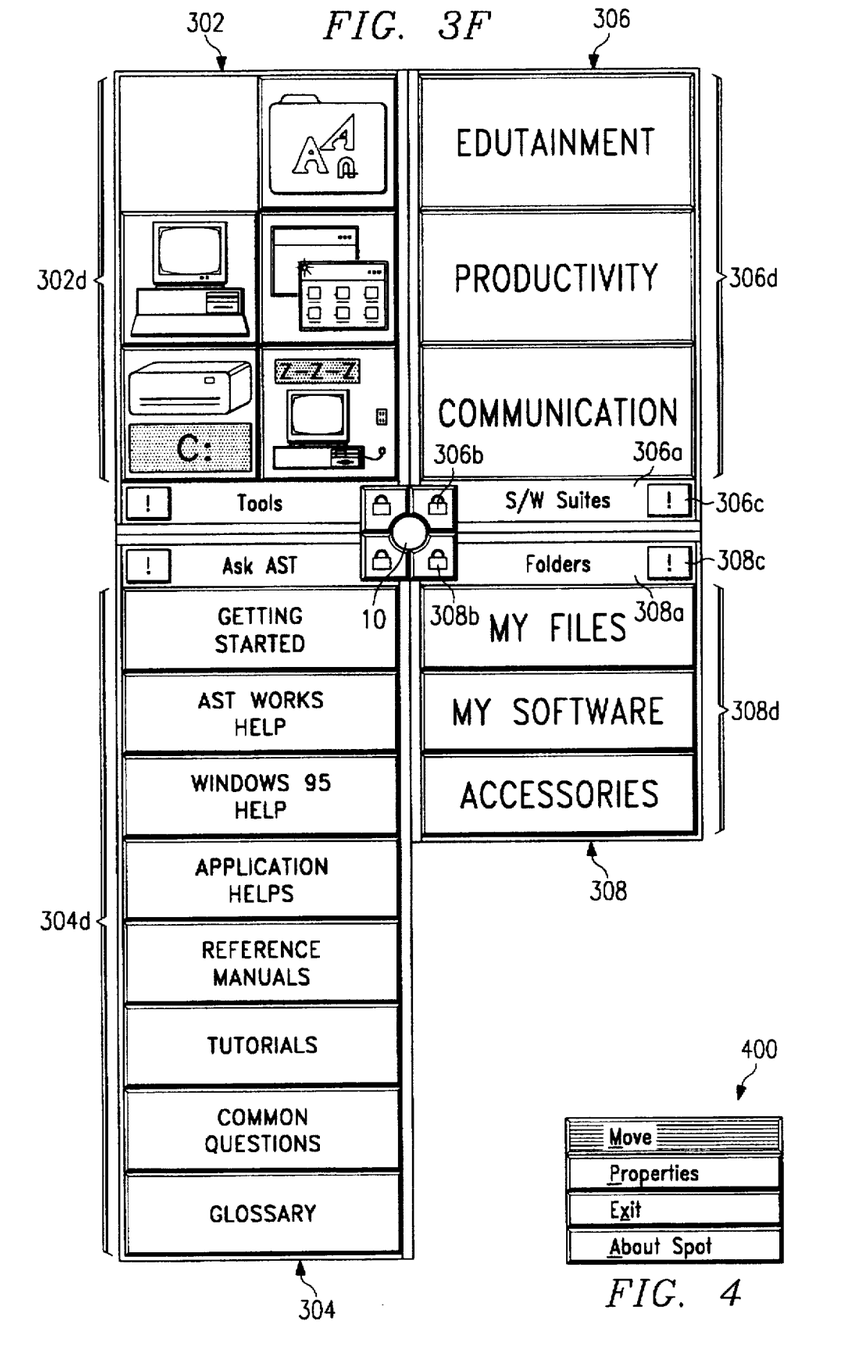
FIG. 4 illustrates a pop-up menu associated with the spot interface of the present invention.

FIG. 3F illustrates the secondary interfaces 302–308 in greater detail. It should be noted that, because the functionality provided by each of the buttons 302d, 304d, 306d and 308d is not germane to the present invention, it is not described in further detail herein.

In one aspect of the invention, various features of the spot interface may be customized by the user. In particular, clicking the right mouse button while the mouse pointer 23 is positioned over any part of the spot interface (i.e., the spot GDE 10, collar 200 and/or secondary interfaces 302–308) causes a pop-up menu 400, as shown in FIG. 4, to be displayed. In the illustrated embodiment, the menu 400 includes four menu picks, including "About Spot," selection of which results in the display of a dialog box informing the user about the spot interface, "Exit," selection of which results in the display of a message box informing the user that he or she is about to exit the spot interface and prompting the user to confirm whether he or she wishes to exit, and "Properties" and "Move," the purposes of which are described in greater detail below.

Figure 5:
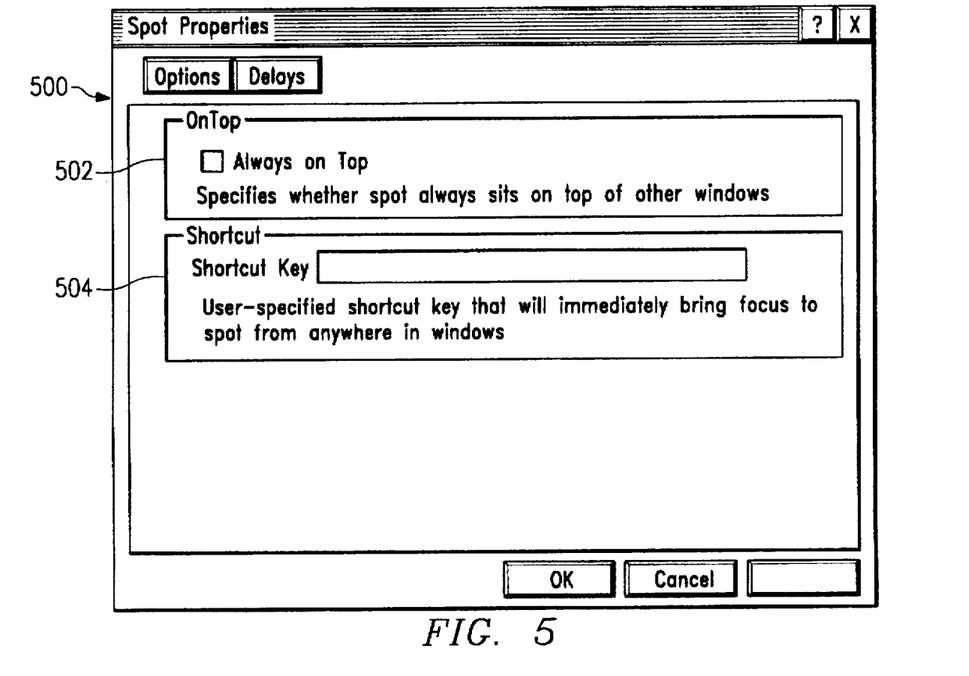
FIG. 5 illustrates an Options page for enabling a user to specify various functional features of the spot interface.

In particular, clicking on the Properties menu pick results in the display of a tabbed dialog box with a page for "Options." An exemplary Options page 500 is shown in FIG. 5. The Options page 500 enables a user to specify, in an "On Top" section 502, whether the spot interface should always be on top of the current window. In the preferred embodiment, the always on top feature will be enabled unless disabled by the user in the On Top section 502 of the Options page 500. The Options page 500 further enables a user to specify, in a Shortcut section 504, a shortcut key that will immediately bring focus to, or select, the spot interface from anywhere in the Windows GUI. There is no default for this feature; that is, unless the user specifies a shortcut key, none will exist.

Figure 6:
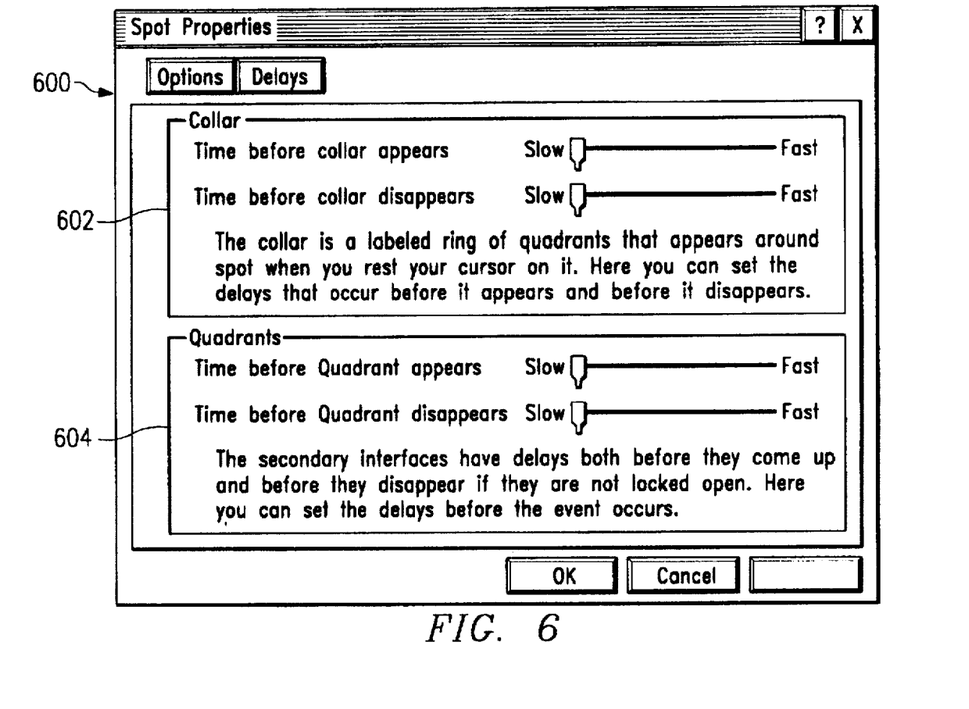
FIG. 6 illustrates a Delays page for enabling a user to specify various aspects of the behavior of the spot interface.

In addition, the Properties dialog box has a page for "Delays." An exemplary Delays page 600 is shown in FIG. 6. The Delays page 600 enables a user to specify, in a "Collar" section 602, the time delay between the mouse pointer's being positioned over the GDE 10 and the collar's being displayed and the time delay between the mouse pointer's being moved off the spot interface and the collar's disappearing. The Delays page 600 further enables the user to specify, in a "Quadrants" section 604, the time delay between the mouse pointer's being positioned over a quadrant and the corresponding secondary interface's being displayed and the time delay between the mouse pointer's being moved off of the secondary interface and the interface's disappearing.

Additionally, an Appearance page (not shown) enables a user to select the color(s) and size of the spot interface and to specify whether the spot GDE 10 periodically animates itself and, if so, how often and for how long. Appropriate default values will be used for the above if different values are not specified by a user.

Moreover, sound effects may be generated in connection with a variety of different events that occur during operation of the spot interface. The names of the various events, as shown below, are included in a "Sound Properties" option of a "Control Panel" window provided by the Windows GUI and can be changed using the conventional sound scheme provided therein. The events with which sounds can be associated include Start Spot, Open Collar, Close Collar, Open Quadrant, Close Quadrant, and Exit Spot. In addition to the above-described properties, the spot interface also saves its location on the display 16 so that it will reappear at the same location on the display 16 the next time it is started.

Although it is anticipated that most users will find it more convenient to interact with the spot interface using the mouse 22, the spot interface is also easily manipulated using a keyboard. In particular, when the spot GDE 10 is selected, either by the user's moving focus to the spot GDE 10 by pressing the ALT and TAB keys simultaneously ("ALT-TAB") or by the user's pressing a predefined key, as described with reference to FIG. 5, the collar 200 will automatically be displayed, just as if the user had moved the mouse pointer 23 over the GDE 10. As shown in FIG. 2, all of the labels that appear on the quadrants 202–208 of the collar 200 have an underlined letter, just like menu items, in order to facilitate keyboard selection of a quadrant. In addition, the spot interface responds to the hot key sequence (SHIFT-F10) that is used to display context sensitive menus using the keyboard. Moreover, the Move menu item of the pop-up menu 400 (FIG. 4) is provided to facilitate keyboard repositioning of the spot interface on the display 16.

Figure 7:
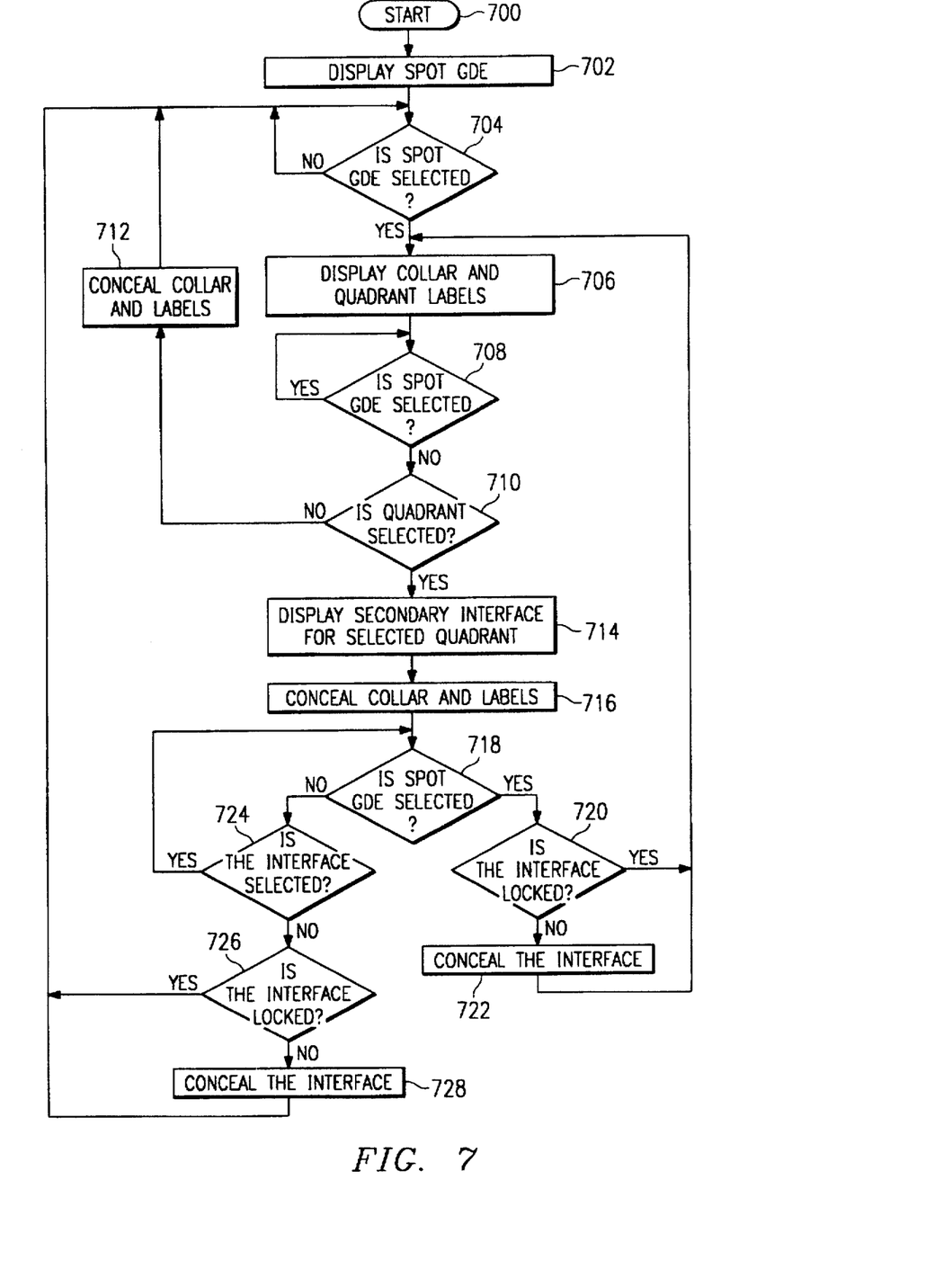
FIG. 7 is a flowchart illustrating a preferred method of implementing the spot interface of the present invention.

FIG. 7 is a flowchart of the method of implementing the spot interface in accordance with the above-described features of the present invention. Execution begins in step 700 upon initiation of the spot interface. In step 702, the spot GDE 10 is displayed on the display 16, it being understood that the appearance and location of the spot GDE 10 is can be specified by a user via the Options page 500 (FIG. 5), the Delays page 600 (FIG. 6) and the Appearance page (not shown).

In step 704, a determination is made whether the spot GDE 10 has been selected. As has been previously described, this selection can occur in one of three ways, including the user's moving the mouse pointer to rest on the spot GDE 10, the user's pressing ALT-TAB to move focus to the spot GDE 10 or the user's pressing the shortcut key defined in the Shortcut section 504 of the Options page 500. If in step 704 it is determined that the spot GDE 10 has not been selected, execution remains at step 704 until the spot GDE 10 is selected. Upon selection of the spot GDE 10, execution proceeds to step 706, in which the collar and quadrant labels, or "tips," are displayed.

In step 708, a determination is again made whether the spot GDE 10 is selected. If so, execution remains at step 708; otherwise, execution proceeds to step 710, in which a determination is made whether one of the quadrants has been selected. A quadrant may be selected by the user's moving the mouser pointer into the quadrant. Alternatively, a quadrant may be selected by the user's pressing the ALT key simultaneously with the key letter designated in the quadrant's label after having selected the spot GDE 10 with the keyboard. If in step 710 a quadrant has not been selected, execution proceeds to step 712, in which the collar and quadrant labels are concealed, then returns to step 7704. If in step 710 it is determined that a quadrant has been selected, execution proceeds to step 714, in which the secondary interface associated with the selected quadrant is displayed. In step 716, the collar and quadrant labels are concealed.

In step 718, a determination is again made whether the spot GDE 10 is selected. If so, execution proceeds to step 720, in which a determination is made whether the interface opened in step 714 is locked. If so, execution returns to step 706; otherwise, execution proceeds to step 722, in which the interface displayed in step 724 is concealed, and then returns to step 706. If in step 718 it is determined that the spot GDE 10 has not been selected, execution proceeds to step 724. In step 724, a determination is made whether the interface displayed in step 714 is selected. If so, execution returns to step 718; otherwise, execution proceeds to step 726, in which a determination is made whether the interface is locked. If so, execution returns to step 704; otherwise, execution proceeds to step 728, in which the interface is concealed, and then to step 704.

It is understood that the present invention can take many forms and embodiments. The embodiments shown herein are intended to illustrate rather than to limit the invention, it being appreciated that variations may be made without departing from the spirit or the scope of the invention. For example, any number of different categories of secondary interfaces, such as a Post-It Notes dispenser, a task list or a more advanced tool bar, may be substituted for the secondary interfaces 302–308 accessible via the spot interface. Moreover, it is anticipated that users will reorganize, modify and customize the contents of the secondary interfaces 302–308.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A method of operating a computer having a display, the method comprising the steps of:

displaying a graphical display element ("GDE") on said display;

detecting selection of said GDE;

responsive to selection of said GDE being detected, displaying on said display a collar associated with said GDE, said collar comprising a plurality of sections, each section having associated therewith a secondary interface;

detecting selection of one of said sections;

responsive to selection of one of said sections being detected, displaying on said display said secondary interface associated with said selected one of said sections; and subsequent to said displaying said secondary interface:
  determining whether said displayed secondary interface remains selected;
  responsive to a determination that said displayed secondary interface is no longer selected, determining whether said displayed secondary interface is locked;
  responsive to determination that said displayed secondary interface is neither selected nor locked, concealing said displayed secondary interface.

2. The method of claim 1 further comprising, subsequent to said displaying said collar, responsive to a determination that said GDE is no longer selected, concealing said collar.

3. The method of claim 1 wherein said displayed secondary interface is locked by using a mouse to click on a lock icon associated with said displayed secondary interface.

4. The method of claim 1 wherein selection of an item from a group of items comprising said GDE, said sections and said secondary interfaces is performed by positioning a mouse pointer over said item.

5. The method of claim 4 wherein said item remains selected only so long as said mouse pointer is positioned over said item.

6. The method of claim 1 further comprising, subsequent to said displaying said secondary interface, responsive to said displayed secondary interface being displayed on said display less than a minimum distance from one or more edges of said display, repositioning said GDE and said displayed secondary interface on said display such that said displayed secondary interface is located at least said minimum distance from said one or more display edges.

7. The method of claim 1 further comprising displaying a menu associated with said GDE for enabling a user to specify an appearance and behavior of said GDE, said collar and said secondary interfaces.

8. The method of claim 1 wherein said GDE comprises a two-dimensional representation of a sphere.

9. The method of claim 8 wherein said collar comprises four sections.

10. A method of operating a computer having a display, the method comprising the steps of:
 displaying a graphical display element ("GDE") on said display;
 detecting selection of said GDE;
 responsive to selection of said GDE being detected, displaying on said display a collar associated with said GDE, said collar comprising a plurality of sections, each section having associated therewith a secondary interface;
 detecting selection of one of said sections;
 responsive to selection of one of said sections being detected, displaying on said display said secondary interface associated with said selected one of said sections; and
 periodically animating said GDE.

11. A method of operating a computer having a display, the method comprising the steps of:
 displaying a graphical display element ("GDE") on said display;
 detecting selection of said GDE;
 responsive to selection of said GDE being detected, waiting a first period of time prior to displaying on said display a collar associated with said GDE, said collar comprising a plurality of sections, each section having associated therewith a secondary interface, wherein a length of said first time period may be specified by a user;
 detecting selection of one of said sections;
 responsive to selection of one of said sections being detected, displaying on said display said secondary interface associated with said selected one of said sections.

12. A method of operating a computer having a display, the method comprising the steps of:
 displaying a graphical display element ("GDE") on said display;
 detecting selection of said GDE;
 responsive to selection of said GDE being detected, displaying on said display a collar associated with said GDE, said collar comprising a plurality of sections, each section having associated therewith a secondary interface;
 detecting selection of one of said sections;
 responsive to selection of one of said sections being detected, waiting a second period of time prior to displaying on said display said secondary interface associated with said selected one of said sections, wherein a length of said second time period may be specified by a user.

13. A method of operating a computer having a display, the method comprising the steps of:
 displaying a graphical display element ("GDE"), said GDE comprising a two-dimensional representation of a sphere and being of minimal size;
 responsive to movement of a mouse pointer over said GDE, thereby to select said GDE, displaying a collar associated with said GDE, said collar encircling said GDE and comprising four quadrants, each of said quadrants having associated therewith a label for identifying said quadrant and a secondary interface;
 responsive to movement of said mouse pointer over one of said quadrants, thereby to select said one of said quadrants, displaying said secondary interface associated with said selected quadrant; and
 subsequent to said displaying said secondary interface, responsive to movement of said mouse pointer off of said displayed secondary interface:
  determining whether said displayed secondary interface is locked; and
  responsive to a determination that said displayed secondary interface is not locked, concealing said displayed secondary interface.

14. The method of claim 13 further comprising, subsequent to said displaying said collar, responsive to movement of said mouse pointer off of said GDE, concealing said collar.

15. The method of claim 13 wherein said displayed secondary interface is locked by using a mouse to click on a lock icon associated with said displayed secondary interface.

16. The method of claim 13 further comprising, subsequent to said displaying said secondary interface, repositioning said GDE and said secondary interface on said display such that said secondary interface is located at least said minimum distance from said one or more display edges when said displayed secondary interface is displayed on said display less than a minimum distance from one or more edges of said display.

17. A method of operating a computer having a display, the method comprising the steps of:
 displaying a graphical display element ("GDE"), said GDE comprising a two-dimensional representation of a sphere and being of minimal size;
 responsive to movement of a mouse pointer over said GDE, thereby to select said GDE, displaying a collar associated with said GDE, said collar encircling said GDE and comprising four quadrants, each of said quadrants having associated therewith a label for identifying said quadrant and a secondary interface;
 responsive to movement of said mouse pointer over one of said quadrants, thereby to select said one of said quadrants, displaying said secondary interface associated with said selected quadrant; and
 periodically animating said GDE.

18. A method of operating a computer having a display, the method comprising the steps of:
 displaying a graphical display element ("GDE"), said GDE comprising a two-dimensional representation of a sphere and being of minimal size;
 responsive to movement of a mouse pointer over said GDE, thereby to select said GDE, displaying a collar associated with said GDE, said collar encircling said GDE and comprising four quadrants, each of said quadrants having associated therewith a label for identifying said quadrant and a secondary interface;

responsive to movement of said mouse pointer over one of said quadrants, thereby to select said one of said quadrants, displaying said secondary interface associated with said selected quadrant; and subsequent to said detecting selection of said GDE, waiting a first period of time prior to performing said displaying said collar associated with said GDE, wherein said a length of said first time period may be specified by a user.

19. In a computer having a display screen, a system implementing a user interface, the system comprising:

means for displaying a graphical display element ("GDE");

means for detecting user-selection of said GDE;

means responsive to user-selection of said GDE being detected for displaying a collar associated with said GDE, said collar comprising a plurality of sections, each section having associated therewith a label for identifying said section and a secondary interface;

means for detecting user-selection of one of said sections;

means responsive to user-selection of one of said sections being detected for displaying said secondary interface associated with said selected one of said sections;

means for determining whether said displayed secondary interface remains selected;

user-actuatable means for locking said displayed secondary interface;

means responsive to a determination that said displayed secondary interface is no longer selected for determining whether said displayed secondary interface is locked; and means responsive to determinations that said displayed secondary interface is neither selected nor locked for concealing said displayed secondary interface.

20. The system of claim 19 further comprising means responsive to a determination that said GDE is not selected for concealing said collar.

21. The system of claim 19 wherein said user-actuatable locking means comprises a lock icon associated with said displayed secondary interface.

22. The system of claim 19 wherein selection of an item from a group of items comprising said GDE, said sections and said secondary interfaces is performed by positioning a mouse pointer over said item.

23. The system of claim 22 wherein said item remains selected only so long as said mouse pointer is positioned over said item.

24. The system of claim 23 further comprising means responsive to said displayed secondary interface being displayed on said display less than a minimum distance from one or more edges of said display for repositioning said GDE and said displayed secondary interface on said display such that said displayed secondary interface is located at least said minimum distance from said one or more display edges.

25. The system of claim 23 wherein said GDE comprises a two-dimensional representation of a sphere.

26. The system of claim 25 wherein said collar comprises four sections.

27. The system of claim 26 wherein each of said secondary interfaces, when displayed, emanate from said GDE.

28. In a computer having a display screen, a system implementing a user interface, the system comprising:

means for displaying a graphical display element ("GDE");

means for detecting user-selection of said GDE;

means responsive to user-selection of said GDE being detected for displaying a collar associated with said GDE, said collar comprising a plurality of sections, each section having associated therewith a label for identifying said section and a secondary interface;

means for detecting user-selection of one of said sections;

means responsive to user-selection of one of said sections being detected for displaying said secondary interface associated with said selected one of said sections; and means for periodically animating said GDE.

29. A user interface for implementation on a computer comprising a display and an input device, said user interface being for presentation on said display and comprising:

a graphical display element (GDE) comprising a two-dimensional representation of a sphere;

a collar encircling said GDE, said collar comprising a plurality of sections; and a plurality of secondary interfaces, each one of said secondary interfaces being associated with one of said sections;

wherein said collar is displayed only so long as said GDE remains selected by a user;

wherein responsive to user selection of one of said sections, said secondary interface associated with said selected one of said sections is displayed; and wherein each of said secondary interfaces comprises a lock icon for toggling said secondary interface between a locked condition, in which said secondary interface remains displayed after said mouse pointer is removed from over said secondary interface, and an unlocked condition, in which said secondary interface is concealed when said mouse pointer is removed from over said secondary interface.

30. The user interface of claim 29 wherein said input device comprises a mouse and selection of an item from a group of items comprising said GDE, said sections and said secondary interfaces is performed by positioning a mouse pointer over said item.

31. The user interface of claim 29 wherein said input device comprises a keyboard and wherein each of said sections comprise a label for enabling a user to select ones of said sections using said keyboard.

32. The user interface of claim 29 further comprising a pop-up menu comprising a plurality of menu picks for enabling a user to alter an appearance and behavior of said user interface.

33. The user interface of claim 29 wherein each of said secondary interfaces comprises a collection of buttons for launching applications programs and opening windows.

34. The user interface of claim 29 wherein said secondary interfaces, when displayed, appear to emanate from a center of said GDE.

35. The user interface of claim 29 wherein said sections comprise quadrants of a circle defined by said collar.

36. The user interface of claim 29 wherein said GDE is perpetually displayed on said display, unless removed by a user.

* * * * *